United States Patent [19]

Corsi

[11] Patent Number: 5,152,645
[45] Date of Patent: Oct. 6, 1992

[54] CABIN MACHINE TOOL, WITH STRUCTURE BEARING MONOCOQUE BODY

[75] Inventor: Armando Corsi, Piacenza, Italy
[73] Assignee: Jobs S.p.A., Piacenza, Italy
[21] Appl. No.: 740,438
[22] Filed: Aug. 5, 1991

[30] Foreign Application Priority Data

Sep. 11, 1990 [IT] Italy .............................. 33517/90[U]

[51] Int. Cl.⁵ .............................................. B23Q 1/02
[52] U.S. Cl. ..................................... 409/235; 408/234
[58] Field of Search ............... 409/134, 137, 235, 236; 408/234

[56] References Cited

U.S. PATENT DOCUMENTS

| | | | |
|---|---|---|---|
| 3,511,129 | 5/1970 | Miller | 409/137 |
| 3,998,127 | 12/1976 | Romeu | 409/235 |
| 4,242,019 | 12/1980 | Roch | 409/235 |
| 4,484,387 | 11/1984 | Machmany | 409/137 |

FOREIGN PATENT DOCUMENTS

| | | | |
|---|---|---|---|
| 3440786 | 7/1986 | Fed. Rep. of Germany | 409/236 |
| 3730404 | 3/1989 | Fed. Rep. of Germany | 364/474.37 |
| 2339 | 3/1989 | PCT Int'l Appl. | 409/134 |
| 11375 | 11/1989 | PCT Int'l Appl. | 408/234 |

*Primary Examiner*—Daniel W. Howell
*Attorney, Agent, or Firm*—Notaro & Michalos

[57] ABSTRACT

The present invention relates to a machine tool and in particular a machine for making three dimensional models, having a carrying structure of the closed monocoque body type, with the advantage of greater lightness and rigidity with respect to known machines with latticework or tubular structures.

13 Claims, 5 Drawing Sheets

CABIN MACHINE TOOL, WITH STRUCTURE BEARING MONOCOQUE BODY

FIELD AND BACKGROUND OF THE INVENTION

The present invention relates to a machine tool and in particular a machine to realise three dimensional models, having a carrying structure of the closed monocoque body type, with the advantage of greater lightness and rigidity with respect to known machines with latticework or tubular structures.

Due to this feature it is possible to give the machine a form such as to improve its manageability and viewing clarity in relation to the work zone, as will be illustrated in detail below in the description.

Thanks to this detail, the machine according to the invention is particularly suitable for use in offices, design studios or similar places.

Automatic or robot machine tools are well known for machining even complex shapes in a completely automatic way, under the control of a computerized structure. Many of these machines have a mobile support along a triad of cartesian axes, on which there is mounted a tool head in its turn equipped with two or more degrees of freedom, to which are applied the tools necessary for the different machining operations. Naturally this involves machines which, with respect to size and weight are not suitable for being used inside offices.

U.S. patent application Ser. No. 07/656,239 describes a machine tool for realizing three dimensional models, to which there can be applied tools of different types to obtain the model from a surface defined using a CAD system.

This need to translate into practical terms a project defined only on paper in an ever more frequent occurrence, for example in design or planning offices, where once a design has been performed it is necessary to quickly realize a model at low cost to see how it looks in reality and then, once all the necessary modifications have been carried out on the model, carry these over to the CAD surface, for the subsequent production phase, mould pressing etc.

Technical progress, which makes available to the users ever more sophisticated software management systems, systems capable of being installed even in micro computers, has extended still further the range of possible application for these apparatuses. To be used advantageously in a planning studio, however, these machines must not only be small, silent and fast, but they must also be sufficiently accurate, able to carry out machining with tolerances of a few microns.

This involves needs which are difficult to resolve in a single package, given that it is necessary, with a support structure that is as light as possible, to endure without any deformation the high accelerations involved in machining at high speed. Whilst with regard to the mechanical and electronic part significant results have already been achieved, there are still different limitations, particularly with regard to the structure carrying the machine.

SUMMARY OF THE INVENTION

To resolve the above problem the present invention proposes a machine tool for realizing three dimensional models, having the special feature that is has a monocoque carrying structure. This feature means it is possible to significantly lighten the machine's weight, whilst maintaining the features of rigidity. It is further possible to reduce the sizes of several parts, or remove some edges etc. so as to obtain better visibility in relation to the machine's work zone.

BRIEF DESCRIPTION OF THE DRAWINGS

This and other features will become clearer in the following detailed description, provided simply as an example, with particular reference to the figures enclosed in which.

DESCRIPTION OF THE PREFERRED EMBODIMENTS

Figure 1:
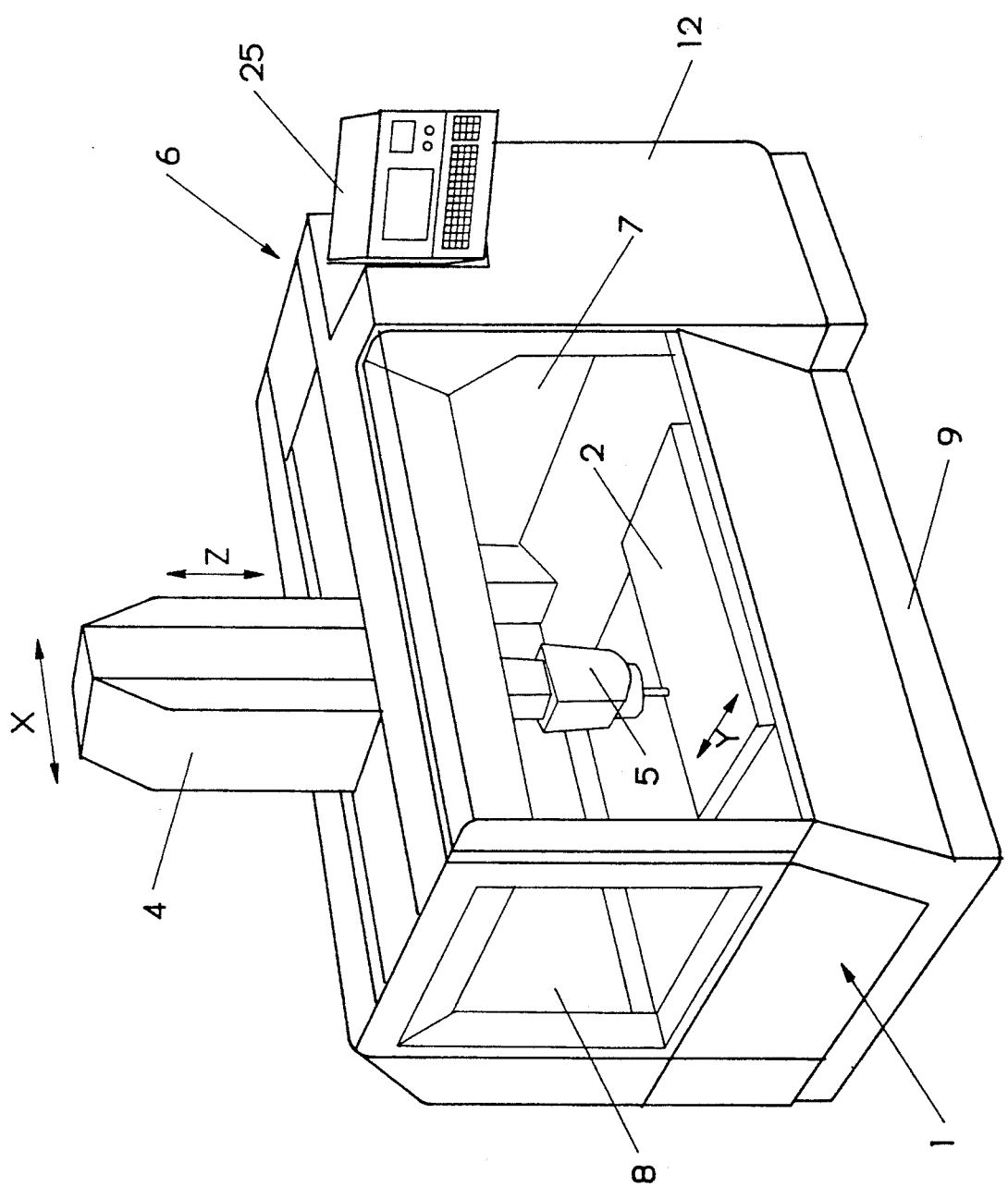
FIG. 1 is a perspective view of a machine of the invention.
Figure 2:
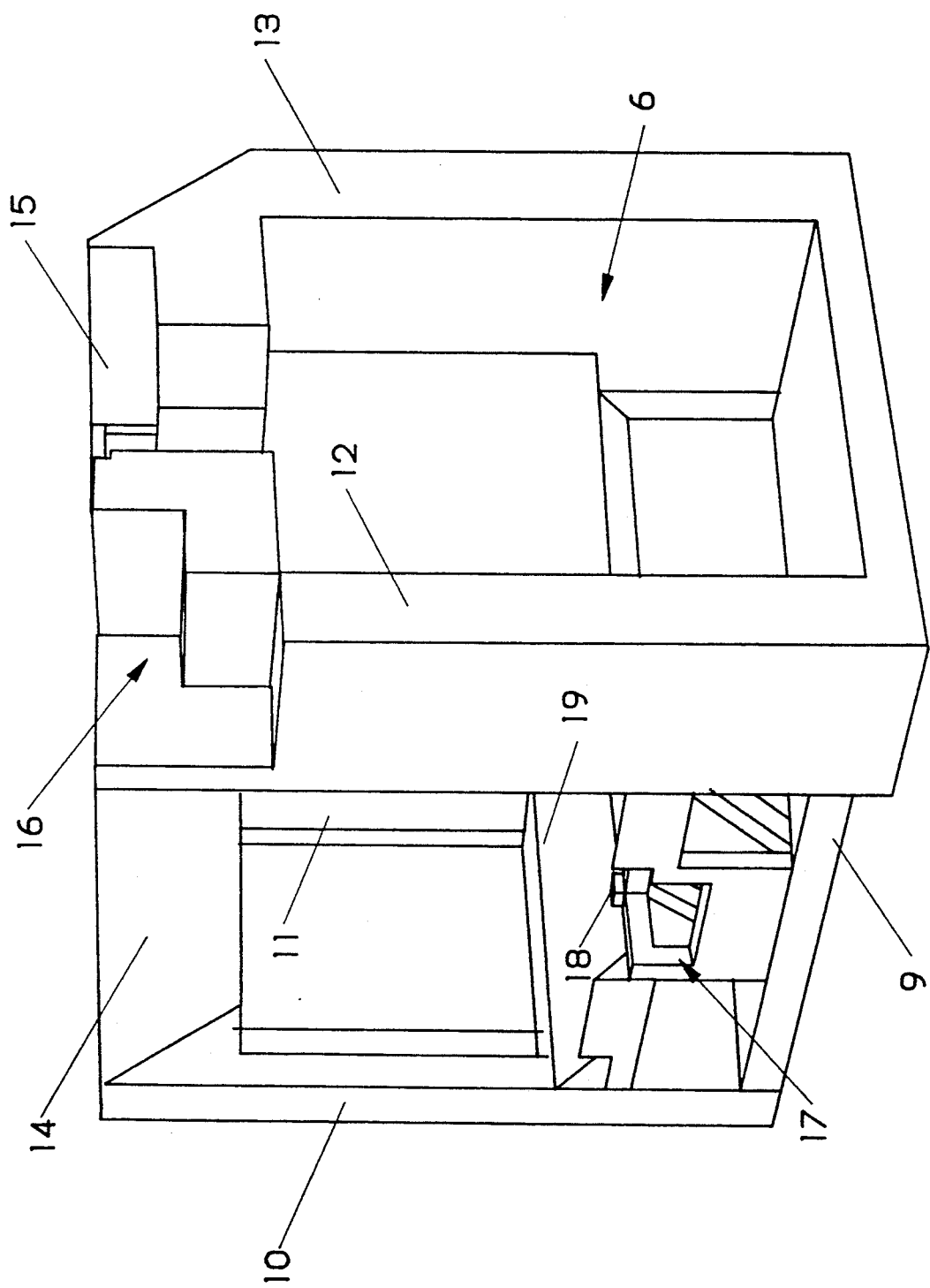
FIGS. 2 and 3 are perspective views of the carrying structure of the machine.
Figure 3:
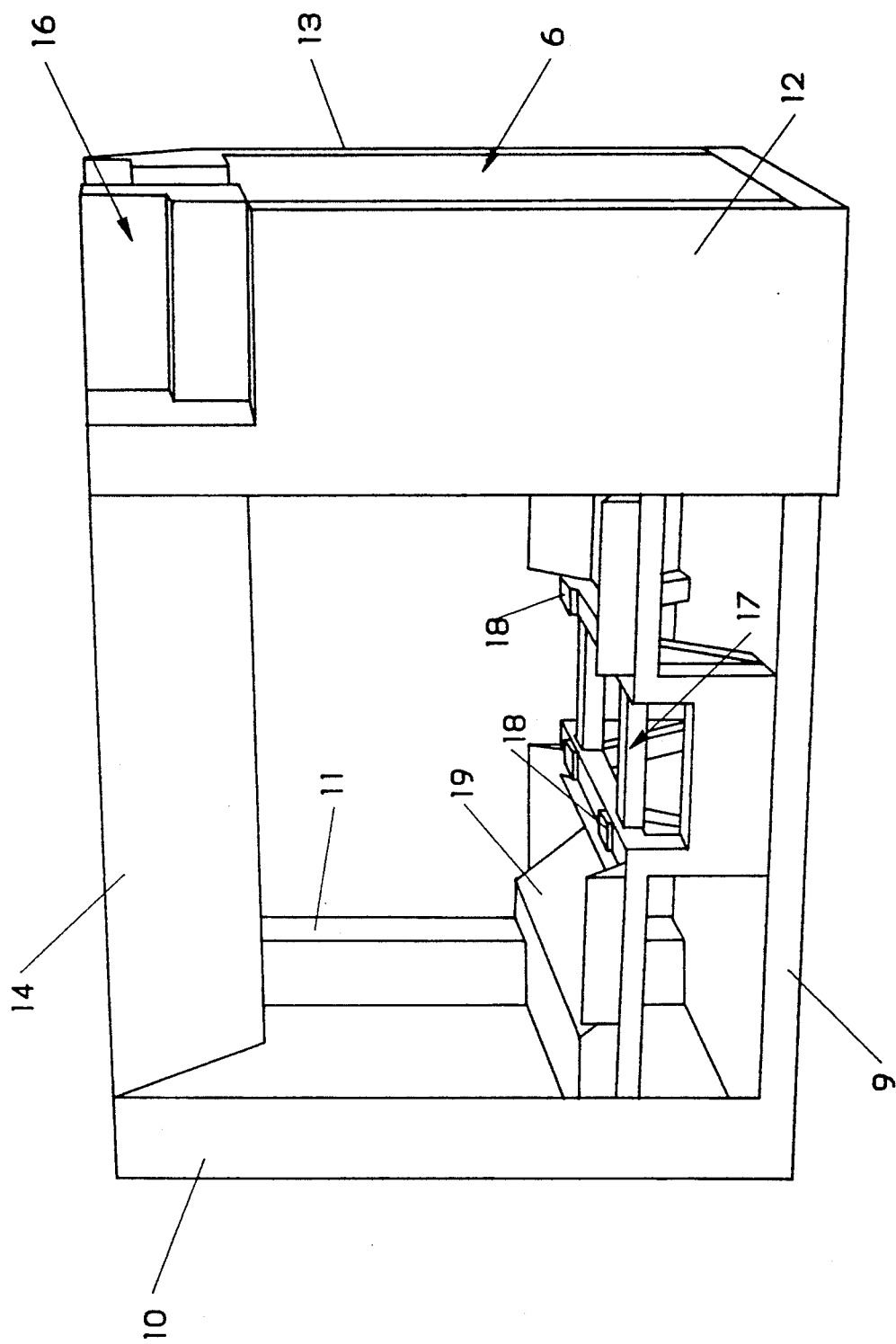

With reference to FIGS. 1 to 4, the machine according to the invention includes a base 1 which has inside a movable platen 2 to support the workpiece to be machined and whose structure includes, on the top, pair of parallel spaced guides 3 along which a sleeve 4 runs, and at the lower end of which there is a tool head 5.

In the figures there are axes coordinate directions or X, Y, and Z along which movements are developed by respectively the sleeve, platen 2 and the head support 5 which, in its turn, preferably has 2 or more further degrees of freedom.

All these movements are controlled by a numeric control (CNC.) as described, for example, in the above-mentioned U.S. patent application Ser. No. 07/656,239 to which the reader is directed for further details. At one end of the machine there is a compartment, indicated in overall terms by the number 6, inside which there are all the control systems. The work zone is accessible from two sides, through doors 7 and 8.

The structure of the machine has a support base 9 made up of a box element of appropriate dimensions with two opposite pairs of corners, to which are welded in relation to one of the minor sides of the box and at its corners, a pair of box shaped relatively small cross section columns 10 and 11 and, on the opposite side, a pair of vertical box shaped columns or members 12 and 13 of larger dimensions.

Two cross pieces 14 and 15 connect respectively column 10 with the vertical member 12 and the vertical column 11 with the member 13.

All these elements, columns 10 and 11, vertical members 12 and 13 and cross pieces 14 and 15, are made from box elements in sheet steel of appropriate thickness, welded to each other in such a way as to form, together with base 9, a closed monolithic, monocoque or parallelepiped structure.

The volume included inside this structure is the machine work zone, while the guides 3 along which the sleeve 4 runs, are welded to the cross pieces 14 and 15. The lower part of the sleeve 4, with the tool head 5, thereby projects below the cross pieces, moving along the X and Y axes.

The vertical members 12 and 13 delimit a zone, included between them, which serves to house the machine electronics and the various devices necessary for its functioning.

This zone is appropriately closed by a casing or similar structure. The machine is then closed in relation to the rear cross piece 15, while it is open on the two remaining sides, to permit access to the interior part.

In this zone closing can be effected using doors which can be opened and which will be illustrated below.

One of the cross pieces—in the specific case the front cross piece 14—has an inclined outer wall thereby allowing better visibility of the internal volume of the machine.

The vertical member 12 has, in its upper end, a recess 16 which defines a seat to house a board containing a monitor and a push button panel.

The thrusts due to the movements of the sleeve 4 along the X axis are absorbed for the most part by the vertical members 12 and 13, whose dimensions are calculated so as to allow them to absorb all these forces without appreciable deformations in their structure, while the columns 10 and 11 (in particular column 10) are of dimensions as reduced as possible to allow better visibility within the machine.

Here, in the central internal zone, there is a trellis structure 17, which constitutes the only trelliswork part of the machine and which includes four rectified supports 18, which form the supports for the sliding table 2.

At the sides of structure 17, two folded sheets 19 define corresponding slipways to gather the shavings, which during the machining falls to the sides of the table and which are removed by devices of a known type, by means of canalisations arranged below the slipways 19.

The doors 7 and 8, in transparent material, can be separated or preferably, as in the case described, they can form a single body.

Figure 6:
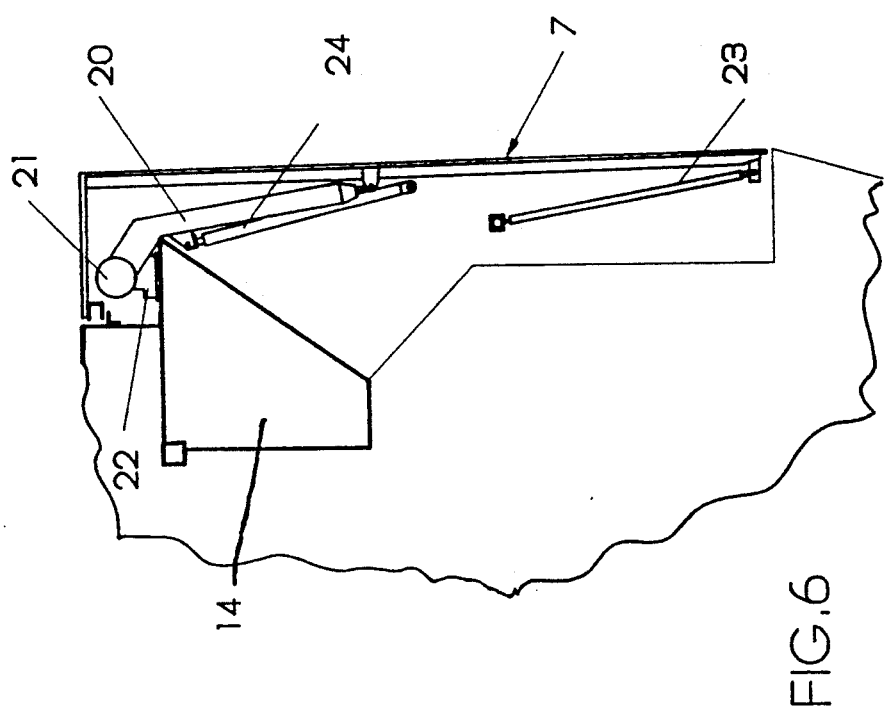
FIG. 6 is a detail in the system of locking the doors.
Figure 4:
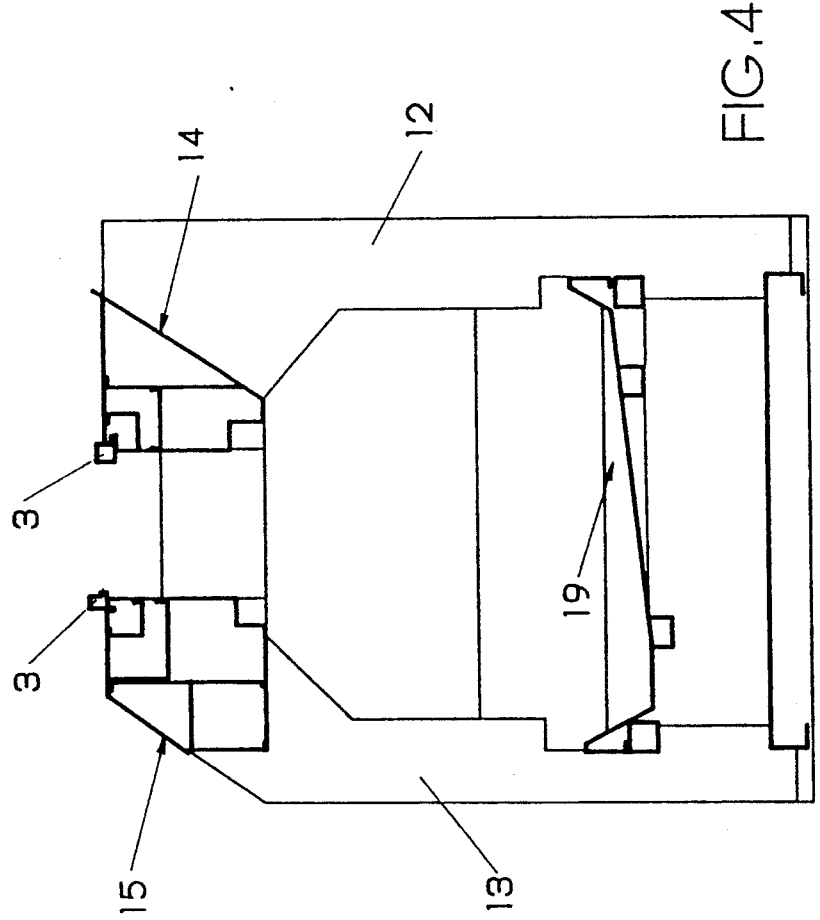
FIGS. 4 and 5 are sections of the monocoque carrying structure.

FIG. 6 shows the system of opening for the doors. Door 7 is hinged to a pair of arms 20, only one of which is illustrated in the figure, rigidly connected by a shaft 21 mounted on supports 22 welded to the front cross piece 14. The lower part of the door is hinged to a pair of connecting rods-guides 23.

The door opens by moving along the arc of a circle, so as to move away first lightly from the machine and subsequently to rise. A gas shock absorber 24 or similar element, absorbs the movements of the door.

For better acoustic insulation of the machine there are provided appropriate support fittings along the whole perimeter of the doors.

The control unit including the monitor and the control push button panel, indicated at 25 in FIG. 1, is arranged so as to be entirely contained in the housing 16 of the vertical member and can be rotated so as to facilitate the operator's task. The operator is usually positioned in front of the door 7, to be able to observe the machine movements.

Figure 7:
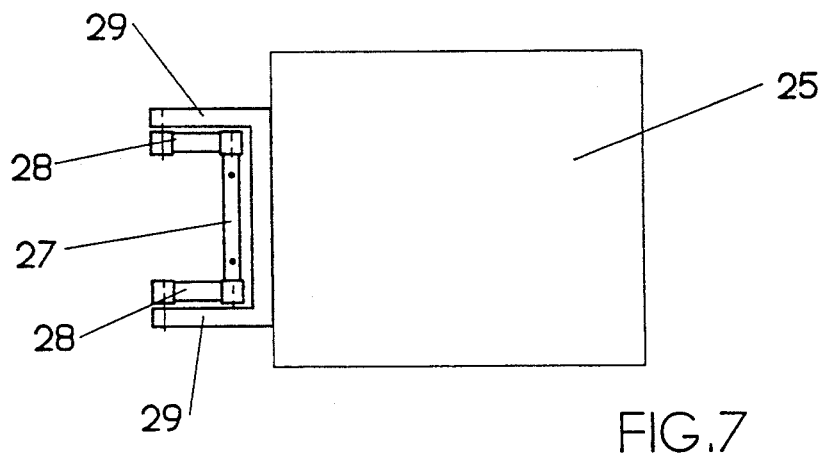
FIG. 7 is a detail of the monitor support in a machine of the invention.
Figure 5:
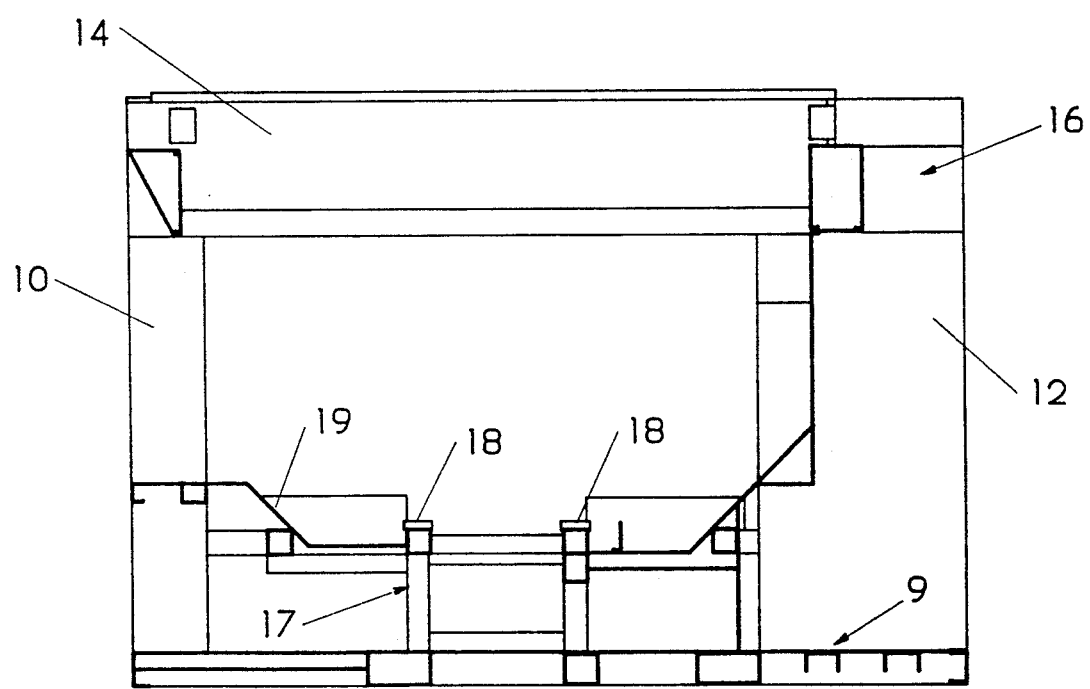

To this end there is a support 27 fixed to the machine structure, at the end of which there are hinged a pair of connecting rods 28 to which there are in turn hinged corresponding arms 29 (FIG. 7) of a C-shaped support to which the control unit 25 is fastened.

This system allows the control unit to carry out a roto-translation movement which allows it to slightly move away from the walls of the recess 16 and subsequently be rotated into the position that is most convenient for the operator.

As will be clear from the description above, the fact of providing the monocoque or parallelepiped structure permits a significant reduction in the machine's weight, whilst maintaining unaltered the rigidity specifications. It is then possible to modify the shaping of the boxed items and in particular the cross pieces to give them a form such which thereby permits better viewing of the work zone.

Obviously, the dimensions, as with the material used, can vary with the specific needs involved.

I claim:

1. A machine tool for making three-dimensional models by machining workpieces, comprising:

a box shaped base (9) having two pairs of opposite corners;

a pair of relatively small cross section box shaped columns (10, 11) fixed to and extending upwardly from the base at one of the opposite pairs of corners;

a pair of relatively large cross section box shaped columns (12, 13) fixed to and extending upwardly from the base at the other of the opposite pairs of corners;

a pair of box shaped cross pieces (14, 15), one of the cross pieces being fixed between upper ends of a small and large cross section column on one side of the base, and the other cross piece being fixed between upper ends of a small and large cross section column at an opposite side of the base, said small and large cross section columns, said base and said cross pieces together defining a rigid, integral parallelepiped structure defining an internal work zone volume, said cross pieces extending parallel to each other in a first coordinate direction (X), and being spaced from each other in a second coordinate direction (Y);

a tool head support sleeve (4) mounted for movement between the cross pieces and in the first coordinate direction;

workpiece support means in the work zone volume for supporting a workpiece in the volume; and a tool head (5) mounted for movement in a third coordinate direction (Z) which is transverse to the first and second coordinate directions, the tool head being mounted for movement to the sleeve and for movement in the first and third coordinate directions, inside the internal work zone volume to machine a workpiece in the volume and to exert thrust forces on the sleeve and cross pieces due to machining of a workpiece in the volume, said large cross section columns being dimensioned larger than said small cross section columns for absorbing a major part of the thrust forces.

2. A machine tool according to claim 1, wherein one of said cross pieces extends across a front side of the parallelepiped structure, said large cross section column at said front side having an upper end with a seat (16), a control unit (25) with a monitor and push button control panel, in said seat, and roto-translation means connected between said control unit and said large cross section column for allowing rotation and translation of the control unit with respect to the seat.

3. A machine tool according to claim 2, wherein said roto-translation means comprises a C-shaped support (29) connected to the control unit, and a pair of connecting rods (28) pivotally connected between said C-shaped support and the large cross section column.

4. A machine tool according to claim 2, including machine control electronic means for controlling movement of the sleeve and tool head, mounted between said large cross section columns.

5. A machine tool according to claim 2, wherein the cross piece at the front side of the structure has an inclined outer wall, inclined inwardly toward the internal work zone volume, in a direction downwardly toward the base.

6. A machine tool according to claim 2, wherein including a lockable door for covering the front side of the structure, a pair of connecting rods pivotally connected between said door and said structure, for movement of said door along a circular arc lying in a vertical plane, and shock absorbing means connected between said door and said structure for absorbing shocks from movement of said door.

7. A machine tool according to claim 6, including a shaft connected between said connecting rods, said shaft being mounted and extending parallel to the cross piece at the front side of the structure, and a pair of second connecting rods pivotally connected between the door and the structure at a location spaced from the first mentioned pair of connecting rods.

8. A machine tool according to claim 2, wherein said workpiece support means comprises a platen (12) mounted for movement parallel to the second coordinate direction (Y), on the base (9), and a plurality of inclined walls (19) defining a slipway below said platen for collecting and removing machining shavings from the internal work zone volume.

9. A machine tool according to claim 1, including machine control electronic means for controlling movement of the sleeve and tool head, mounted between said large cross section columns.

10. A machine tool according to claim 1, wherein the parallelepiped structure has a broad front side and narrow end side, the cross piece at the front side of the structure having an inclined outer wall, inclined inwardly toward the internal work zone volume, in a direction downwardly toward the base.

11. A machine tool according to claim 1, wherein the parallelepiped structure has a broad front side and narrow end side, a lockable door for covering the front side of the structure, a pair of connecting rods pivotally connected between said door and said structure, for movement of said door along a circular arc lying in a vertical plane, and shock absorbing means connected between said door and said structure for absorbing shocks from movement of said door.

12. A machine tool according to claim 11, including a shaft connected between said connecting rods, said shaft being mounted and extending parallel to the cross piece at the front side of the structure, and a pair of second connecting rods pivotally connected between the door and the structure at a location spaced from the first mentioned pair of connecting rods.

13. A machine tool according to claim 1, wherein said workpiece support means comprises a platen (12) mounted for movement parallel to the second coordinate direction (Y), on the base (9), and a plurality of inclined walls (19) defining a slipway below said platen for collecting and removing machining shavings from the internal work zone volume, the parallelepiped structure has a broad front side and narrow end side, the cross pieces being parallel to the front side.

* * * * *